(12) United States Patent
Chiu et al.

(10) Patent No.: US 8,407,319 B1
(45) Date of Patent: Mar. 26, 2013

(54) EVENT-DRIVEN MODULE LOADING

(75) Inventors: Bikin Chiu, Mississauga (CA); Alex Kennberg, Waterloo (CA); Neil Richard Thomas, Richmond (CA)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 12/730,697

(22) Filed: Mar. 24, 2010

(51) Int. Cl.
G06F 15/16 (2006.01)
(52) U.S. Cl. ............ 709/219; 717/100; 717/106
(58) Field of Classification Search .......... 709/201, 709/203, 218, 219; 717/100, 106, 114, 117, 717/136, 140
See application file for complete search history.

(56) References Cited

U.S. PATENT DOCUMENTS

| | | | |
|---|---|---|---|
| 6,011,537 A | 1/2000 | Slotznick | |
| 6,061,698 A | 5/2000 | Chadha et al. | |
| 6,351,536 B1 | 2/2002 | Sasaki | |
| 6,725,424 B1 | 4/2004 | Schwerdtfeger et al. | |
| 7,152,203 B2 | 12/2006 | Gao et al. | |
| 7,240,279 B1 | 7/2007 | Chartier et al. | |
| 7,340,499 B1 | 3/2008 | Casella | |
| 7,437,442 B2 | 10/2008 | Ashiya | |
| 7,461,339 B2 | 12/2008 | Liao et al. | |
| 7,574,692 B2 * | 8/2009 | Herscu ............... | 717/116 |
| RE41,440 E | 7/2010 | Briscoe et al. | |
| 7,814,410 B2 | 10/2010 | Kothari et al. | |
| 2002/0147772 A1 | 10/2002 | Glommen et al. | |
| 2003/0121000 A1 | 6/2003 | Cooper et al. | |
| 2004/0113908 A1 | 6/2004 | Galanes et al. | |
| 2004/0135589 A1 * | 7/2004 | Matuschek et al. ....... | 324/691 |
| 2005/0198300 A1 | 9/2005 | Gong et al. | |
| 2006/0155780 A1 | 7/2006 | Sakairi et al. | |
| 2006/0190561 A1 | 8/2006 | Conboy et al. | |
| 2007/0156871 A1 | 7/2007 | Braun et al. | |
| 2007/0169011 A1 * | 7/2007 | Ramani et al. ........... | 717/136 |
| 2008/0046254 A1 | 2/2008 | Nuno et al. | |
| 2008/0104025 A1 | 5/2008 | Dharamshi et al. | |
| 2008/0178162 A1 | 7/2008 | Sanford et al. | |
| 2008/0235671 A1 | 9/2008 | Kellogg et al. | |
| 2008/0301460 A1 | 12/2008 | Miller | |
| 2009/0100154 A1 | 4/2009 | Stevenson et al. | |
| 2009/0225039 A1 | 9/2009 | Williamson et al. | |
| 2009/0260087 A1 | 10/2009 | Ishida et al. | |
| 2010/0017464 A1 | 1/2010 | Cheng et al. | |
| 2010/0057843 A1 | 3/2010 | Landsman et al. | |
| 2010/0131951 A1 | 5/2010 | Carteri et al. | |
| 2010/0235726 A1 | 9/2010 | Ording et al. | |
| 2011/0015917 A1 | 1/2011 | Wang et al. | |
| 2011/0028999 A1 | 2/2011 | Chu | |
| 2011/0029899 A1 | 2/2011 | Fainberg et al. | |

(Continued)

OTHER PUBLICATIONS

Ajile 1.2.1., [retrieved on Mar. 23, 2010]. Retrieved from the Internet: http://ajile.net/docs/Ajile-Overview.htm, 3 pages.

(Continued)

*Primary Examiner* — Frantz Jean
(74) *Attorney, Agent, or Firm* — Fish & Richardson P.C.

(57) ABSTRACT

Methods, systems, and apparatus, including computer programs encoded on a computer storage medium, for event-driven module loading. In one aspect, a method includes obtaining a mapping for a resource, wherein the mapping identifies one or more events that, upon occurrence, will trigger a dynamic loading of one or more code modules that are referenced by the resource, determining that an event has occurred, identifying one or more of the code modules that are associated with the event, based on the mapping, and dynamically loading the identified code modules.

19 Claims, 5 Drawing Sheets

U.S. PATENT DOCUMENTS

2011/0119352 A1* 5/2011 Perov et al. .................. 709/218
2011/0267653 A1 11/2011 Yamamoto

OTHER PUBLICATIONS

Developer's Guide—Code Splitting, [retrieved on Mar. 23, 2010]. Retrieved from the Internet: http://code.google.com/webtoolkit/doc/latest/DevGuideCodeSplitting.html, 11 pages.

Office Action for U.S. Appl. No. 13/249,419 dated Apr. 4, 2012. 13 pages.

Office Action for U.S. Appl. No. 13/249,419 dated Dec. 9, 2011. 9 pages.

Notice of Allowance for U.S. Appl. No. 13/249,419 dated Jun. 8, 2012, 7 pages.

Google Code Blog: Gmail for Mobile HTML5 Series—Reducing Startup Latency, dated Sep. 3, 2009, [retrieved 1 on May 19, 2010]. Retrieved from the Internet: http://googlecode.blogspot.com/2009/09/gmail-for-mobile-html5-series-reducing.html, 4 pages.

Office Action issued in U.S. Appl. No. 12/782,830 dated Dec. 22, 2011, 20 pages.

Office Action issued in U.S. Appl. No. 12/782,830 dated Jun. 13, 2012, 19 pages.

Office Action issued in U.S. Appl. No. 13/249,694 dated Nov. 29, 2011, 22 pages.

Office Action issued in U.S. Appl. No. 13/249,694 dated Apr. 4, 2012, 20 pages.

Office Action issued in U.S. Appl. No. 13/249,694 dated Jun. 28, 2012, 17 pages.

* cited by examiner

EVENT-DRIVEN MODULE LOADING

BACKGROUND

This specification generally relates to the dynamic loading of code modules.

Performance is a key concern for mobile web applications. For instance, it is particularly desirable to maintain a short startup time when loading resources (e.g., JavaScript resources). As more and more features are added to web applications, the amount of JavaScript code that is used by these web applications continues to dramatically increase, making it difficult to achieve the desired, short startup times.

SUMMARY

In general, one innovative aspect of the subject matter described in this specification may be embodied in methods that include the actions of breaking up code (e.g., JavaScript code) into modules, and delaying the loading of each module until the module is actually required by a web application, or is estimated to soon be required by the web application. According to one approach, the loading of a module is delayed until an event occurs, for example upon the occurrence of a user action or a change in device state. In doing so, modules may be loaded right before they are needed, reducing the startup time of the web application.

In general, another innovative aspect of the subject matter described in this specification may be embodied in methods that include the actions of obtaining a mapping for a resource, where the mapping identifies one or more events that, upon occurrence, will trigger a dynamic loading of one or more code modules that are referenced by the resource, determining that an event has occurred, identifying one or more of the code modules that are associated with the event, based on the mapping, and dynamically loading the identified code modules.

In general, another innovative aspect of the subject matter described in this specification may be embodied in methods that include the actions of receiving a mapping that identifies one or more events that, upon occurrence, will trigger a dynamic loading of one or more code modules that are referenced by a resource, using the mapping to identify, when an event occurs, one or more of the code modules that are associated with the event, and dynamically loading the identified code modules.

In general, another innovative aspect of the subject matter described in this specification may be embodied in methods that include the actions of generating information that associates one or more events with one or more code modules that are referenced by a resource, determining that one or more of the events has occurred, and dynamically loading one or more of the code modules that the information indicates are associated with the event.

Other embodiments of these aspects include corresponding systems, apparatus, and computer programs, configured to perform the actions of the methods, encoded on computer storage devices.

These and other embodiments may each optionally include one or more of the following features. For instance, the actions may include loading, before determining that the event has occurred, the resource without loading the code modules that are referenced by the resource; the code module may be a JavaScript code module; one or more of the events may be an initial load event that occurs when the resource is initially loaded; one or more of the events may be a data communication event that occurs when data of a particular type is communicated; one or more of the events may be an event that occurs when a Document Object Model (DOM) event is detected; one or more of the events may be a control selection event that occurs when a control is selected on a client device; one or more of the events may be a view change event that occurs when a user interface of a client device switches from a first view to a second view; one or more of the events may be a timer firing event that occurs when a predetermined amount of time elapses; obtaining a mapping for a resource further may include receiving the mapping for the resource by a client device, determining that an event has occurred may include determining, by the client device, that the event has occurred on the client device, identifying one or more of the code modules may include identifying the one or more of the code modules, by the client device, and dynamically loading the identified code modules may include receiving the identified code modules by the client device; obtaining a mapping for a resource may include selecting the mapping from among a collection of mappings, by a server, determining that an event has occurred may include receiving, by the server, information from a client device, and determining, by the server, and based on the information received from the client device, that the event has occurred, identifying one or more of the code modules may include identifying the one or more of the code modules, by the server, and dynamically loading the identified code modules may include communicating, by the server, an instruction to a host of the identified code modules to transmit the identified code modules to the client device; the actions may include determining an identity of a user, where obtaining a mapping for the resource may include selecting the mapping, from among a collection of mappings, based on the identity of the user; different users may be associated with different mappings in the collection; the actions may include accessing historical usage data pertaining to past interactions between a user and the resource, and generating the mapping based on the historical usage data; generating the mapping may include determining that, on average, the user accesses a first feature of the resource that is associated with a first code module more frequently than the user accesses a second feature of the resource that is associated with a second code module, and responsive to determining that, on average, the user accesses the first feature more frequently than the second feature, adjusting the mapping to associate an initial load event with the first code module, and to associate an event other than an initial load event with the second code module; generating the mapping may include determining that, on average, the user accesses a first feature of the resource that is associated with a first code module more frequently than the user accesses a second feature of the resource that is associated with a second code module, and responsive to determining that, on average, the user accesses the first feature more frequently than the second feature, adjusting the mapping to associate timer firing events with both the first code module and the second code module, where the timing firing event associated with the first code module may have a shorter firing time than the timing firing event associated with the second code module; generating the mapping may further include adjusting the mapping to demote a code module from being associated with an initial load event, to being associated with a data communication event, a control selection event, or a timing firing event; and/or the actions may include invoking the identified code modules, and responsive to invoking the identified code modules, rendering an updated user interface.

The details of one or more embodiments of the subject matter described in this specification are set forth in the accompanying drawings and the description, below. Other features, aspects and advantages of the subject matter will be apparent from the description and drawings, and from the claims.

DETAILED DESCRIPTION

Figure 1:
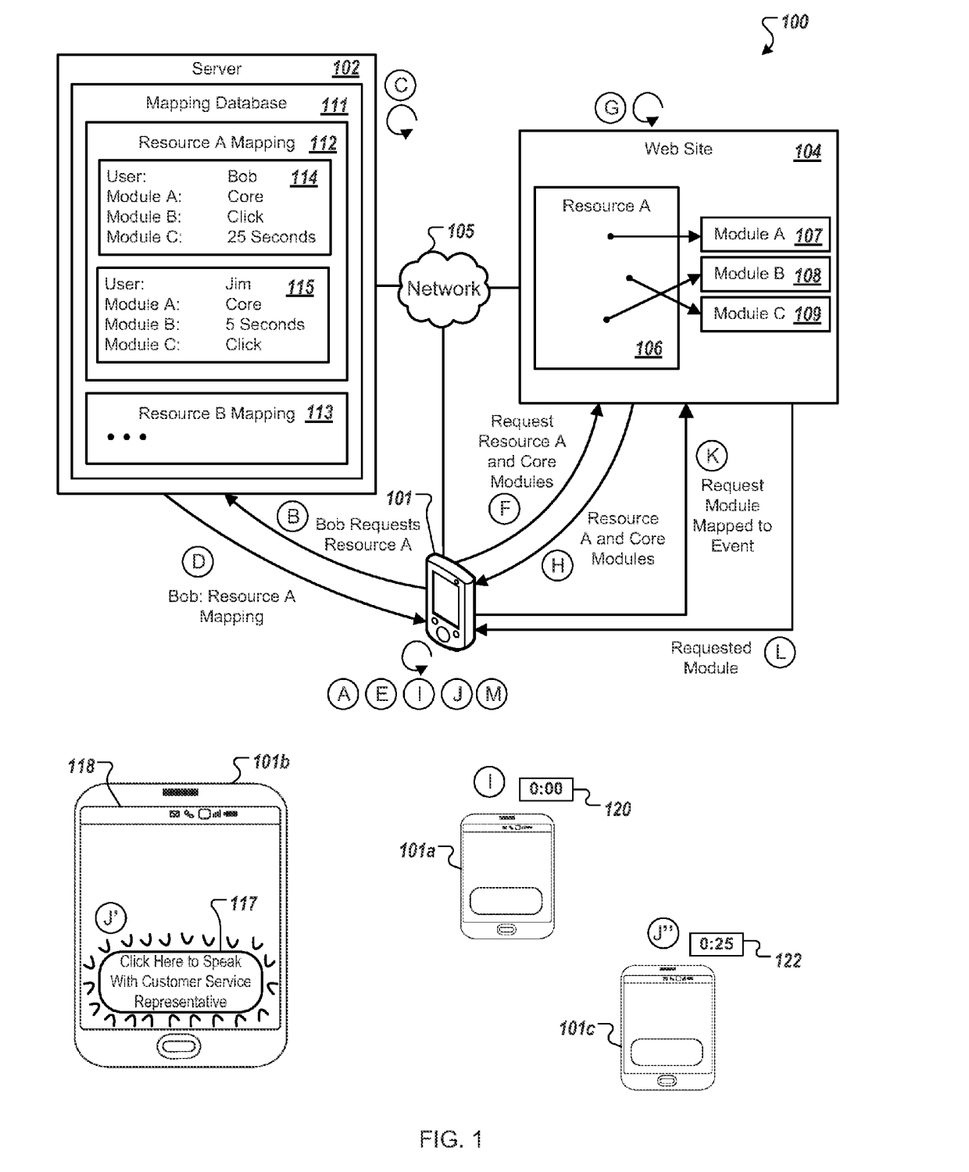
FIGS. 1 and 5 are diagrams that illustrate event-driven, dynamic loading of code modules.

FIG. 1 is a diagram that illustrates event-driven, dynamic loading of code modules. Specifically, example system 100 includes a client device 101, a server 102, and a web site 104, connected by way of a network 105. The web site 104 hosts a resource 106 ("Resource A") that references code modules 107 to 109. For example, the resource 106 may be a Hyper-Text Markup Language (HTML) document or an eXtensible Markup Language (XML) document and the code modules 107 to 109 may be JavaScript modules referenced by the resource 106.

Initially, and as referred to by this specification, "dynamic loading" refers to a process by which an application can, at runtime, load a resource (e.g., a file, a module, library, or binary) into memory, retrieve the addresses of functions and variables that are referenced by the resource, execute those functions or access those variables, and unload the resource from memory. Unlike static linking, dynamic loading allows a computer program to start up without the resource.

The server 102 includes a mapping database 111 that stores mappings for different resources, including a mappings 112 for the resource 106 ("Resource A") and a mappings 113 for another resource ("Resource B"). For each resource, the mappings 112 may include mappings for different users or clusters of users, such as a mapping 114 for the resource 106 and a user "Bob," and a mapping 115 for the resource 106 and a user "Jim." The mappings 114 and 115 associate one or more events for each of one or more code modules, for each respective user. Using the mappings 112, a web application associated with the resource 106 is configured to trigger the dynamic loading of a respective code module mapped to an event based on the occurrence of an event.

In state "A," the user "Bob" enters a command into the client device 101 to invoke a web application that calls for the resource 106 to be loaded. For example, the web application may an electronic shopping cart application and the resource 106 may be an HTML document which implements an initial user interface of the electronic shopping cart application.

In state "B," the client device 101 sends, to the server 102, a request to access the resource 106. In addition to identifying the resource 106, the information communicated between the client device 101 and the server 102 includes information that uniquely identifies the user "Bob" and/or the client device 101.

In state "C," upon receiving the request to access the resource 106, the server 102 consults the mapping database 111 to identify a mapping that is associated with both the resource 106 and the user "Bob," or the resource 106 and a cluster of users in which the user "Bob" is a member. In doing so, the server 102 identifies the mapping 114.

The mapping 114 includes several parameters associated with the resource 106 and the modules 107 to 109 that are referenced by the resource 106, where the parameters are tailored to the user "Bob." Specifically, the mapping 114 specifies that the module A 107 is a "core" module that should be loaded when the resource 106 is initially loaded, that the module B 108 should be loaded upon the selection of a control by the user "Bob" after the resource 106 is initially loaded, and that the module C 109 should be loaded twenty-five seconds after the resource 106 is initially loaded. In some implementations, core modules, such as the module A 107, are associated with users on a per-user basis (such as in the mapping 114 for the user "Bob") and in other implementations and for some resources, some or all core modules are associated with the corresponding resource but are not directly associated with individual users. In another implementation, modules that are not identified in a particular mapping are considered to be core modules, by default.

In contrast with the mapping 114, the mapping 115 for the user "Jim" includes several different parameters associated with the resource 106 and the modules 107 to 109. Specifically, and like the mapping 114, the mapping 115 specifies that the module A 107 is a core module that should be loaded when the resource 106 is initially loaded. Unlike the mapping 114, however, the mapping 115 specifies that the module B 108 should be loaded five seconds after the resource 106 is initially loaded, and that the module C 109 should be loaded upon the selection of a control by the user "Jim" after the resource 106 is initially loaded.

Mappings may be generated based on historical usage data. For example, the fact that the module B 108 is loaded five seconds after the resource 106 is initially loaded for the user "Jim" while the module B 108 is not loaded until after the user "Bob" selects a control may indicate that the user "Jim" typically uses a feature of the resource 106 that is associated with the module B 108 more frequently than the user "Bob." For example, the module B may be associated with an application feature which enables a user to communicate with a customer service representative. The user "Bob" may rarely (or never) communicate with a customer service representative, which may result in the mapping of the module B 108 to a control click event. Consequently, the module B 108 will be loaded for the user "Bob" after and in response to a control click event. Since the user "Bob" rarely or never uses the communicate-with-customer-service-representative feature, loading the module B 108 only in response to a control event associated with the communicate-with-customer-service-representative feature may reduce the overall amount of time spent loading code modules during typical uses of the web application by the user "Bob," thereby reducing delays and improving the overall user experience.

In contrast, the user "Jim" may frequently communicate with a customer service representative (e.g., perhaps the user "Jim" prefers to provide payment information to a representative rather than enter payment information online). In response to detection of frequent use of the communicate-with-customer-service-representative feature, the module B 108 may be mapped, for the user "Jim", to a time-elapse event so that the module B 108 is loaded shortly after (e.g., five seconds after) the resource 106 is loaded, so that the user "Jim" does not experience a delay when invoking the communicate-with-customer-service-representative feature. Although the user experience may be different for the user "Bob," and the user "Jim," the differences are tailored to decrease the amount of time that is required to access features that each particular user actually uses, based on the users' respective past usage patterns.

As another example, the fact that the module C 109 is loaded twenty five seconds after the resource 106 is initially loaded for the user "Bob," while the module C 109 is not loaded until after the user "Jim" selects a control, may indicate that the user "Bob" typically uses a feature of the resource 106 that is associated with the module C 109 more frequently than does the user "Jim." Furthermore, the fact that the module B 108 is loaded for the user "Jim" five seconds after the resource 106 is initially loaded, while the module C 109 is loaded for the user "Bob" twenty five seconds after the resource 106 is initially loaded, may indicate that the user "Jim" typically uses a feature of the resource 106 that is associated with the module B 108 more frequently than the user "Bob" uses a feature of the resource 106 that is associated with the module C 109.

As another example, the twenty five second time value associated with the module C 109 for the user "Bob" may indicate that the user "Bob" typically uses a feature of the resource 106 associated with the module C 109 on average twenty six or thirty seconds after the resource 106 is initially loaded. For example, the module C 109 may be associated with a shipping options feature of an electronic shopping cart application. The user "Bob" may frequently use the shipping options feature, but may typically do so on average twenty six or thirty seconds after an order summary user interface is displayed on the client device 101.

Continuing with the example illustrated in FIG. 1, in state "D," the server 102 transmits a copy of the mapping 114 to the client device 101. In state "E," the client device 101 consults the mapping 114 to determine which code modules associated with the resource 106 are core modules that should be loaded with the initial load of the resource 106, and identifies the module A 107 as a core code module. The client device 101 also registers handlers for any other events that are identified in the mapping 114. For example, an event handler may be registered for a control event which is associated with the module B 108. As another example, a timer event handler may be registered in association with the module C 109.

In state "F," the client device 101 communicates a request to the web site 104 for the resource 106 and the 'core' module A 107. In order to decrease startup time, the client device 101 does not request the module B 108 or the module C 109 in state "F." In state "G," the web site 104 processes the request and, in state "H," communicates a copy of the resource 106 and a copy of the module A 107 to the client device 101. In state "I," the client device 101 loads the copy of the resource 106 and the copy of the module A 107. Also, in state "I", as illustrated by a client device 101a, the client device 101a may start a timer 120 which is associated with one or more timer event handlers.

In state "J," an event handler detects that one or more of the other events (e.g., events other than an initial load event associated with core modules) that are identified in the mapping 114 occurs. In response to detecting the event, the client device 101 communicates, in state "K", a request for the module associated with the event to the web site 104. In the first of two examples of event detection, illustrated as state "J'," the event is a control selection event that triggers the dynamic loading of the module B 108 based upon the selection of a control 117 in a user interface 118 that is displayed on the client device 101 (illustrated in state "J'" as a client device 101b). When an event handler detects that the control 117 has been selected, the client device 101b communicates, in state K, a request for the module B 108 to the web site 104, and the web site 104 responds, in state "L," by communicating a copy of the code module B 108 to the client device 101b.

In a second example, illustrated as state "J"," the event is a timer firing event that triggers the dynamic loading of the code module C 109 based upon a predetermined period of time elapsing after the initial loading of the resource 106 and/or any core code modules (e.g., state "I"). In this example, the parameters of the mapping 114 indicate that the code module C 109 is to be loaded twenty-five seconds after the initial loading of the resource 106. When an event handler detects that twenty-five seconds has elapsed (e.g., as illustrated by a timer 122), the client device (illustrated in state "J"" as a client device 101c) communicates, in state "K," a request for the module C 109 to the web site 104, and the web site 104 responds, in state "L," by communicating a copy of the code module C 109 to the client device 101.

In state "M," the client device 101 dynamically loads the copy of the code modules that are received from the web site 104. If the code module is loaded in response to a control event, the client device 101 may, after loading the code module, invoke the code module. In response to invoking some code modules, an updated user interface may be rendered on the client device 101. For example, if the code module B 108 is loaded in response to user selection of the control 117, the code module B 108 may be invoked and functionality for a communicate-with-customer-service-representative feature may be performed. In contrast, if the code module is loaded in response to a timer fire event, code in the code module may not be executed until the user selects a control associated with the feature.

In general, the system 100 provides the advantages of 'correctness,' laziness; and 'abstraction.' With regard to correctness, the module loader on the client device 101 ensures that each of the modules 107 to 109 is loaded before it is needed, to prevent the web application from failing. With regard to laziness, the module loader on the client device 101 may not load any of the modules 107 to 109 until just before it is needed, to prevent degradation of performance. Modules that are associated with features that a user does not select, may never be required and may therefore never be loaded. With regard to abstraction, the module loader on the client device 101 hides the complexity of loading the code modules 107 to 109 on an as-needed basis from the web application. The code of the web application operates as though the code modules 107 to 109 will always be loaded when required, without having to explicitly specify when to load those modules. Abstraction prevents the code of the web application from quickly becoming complicated and therefore harder to maintain.

Figure 2:
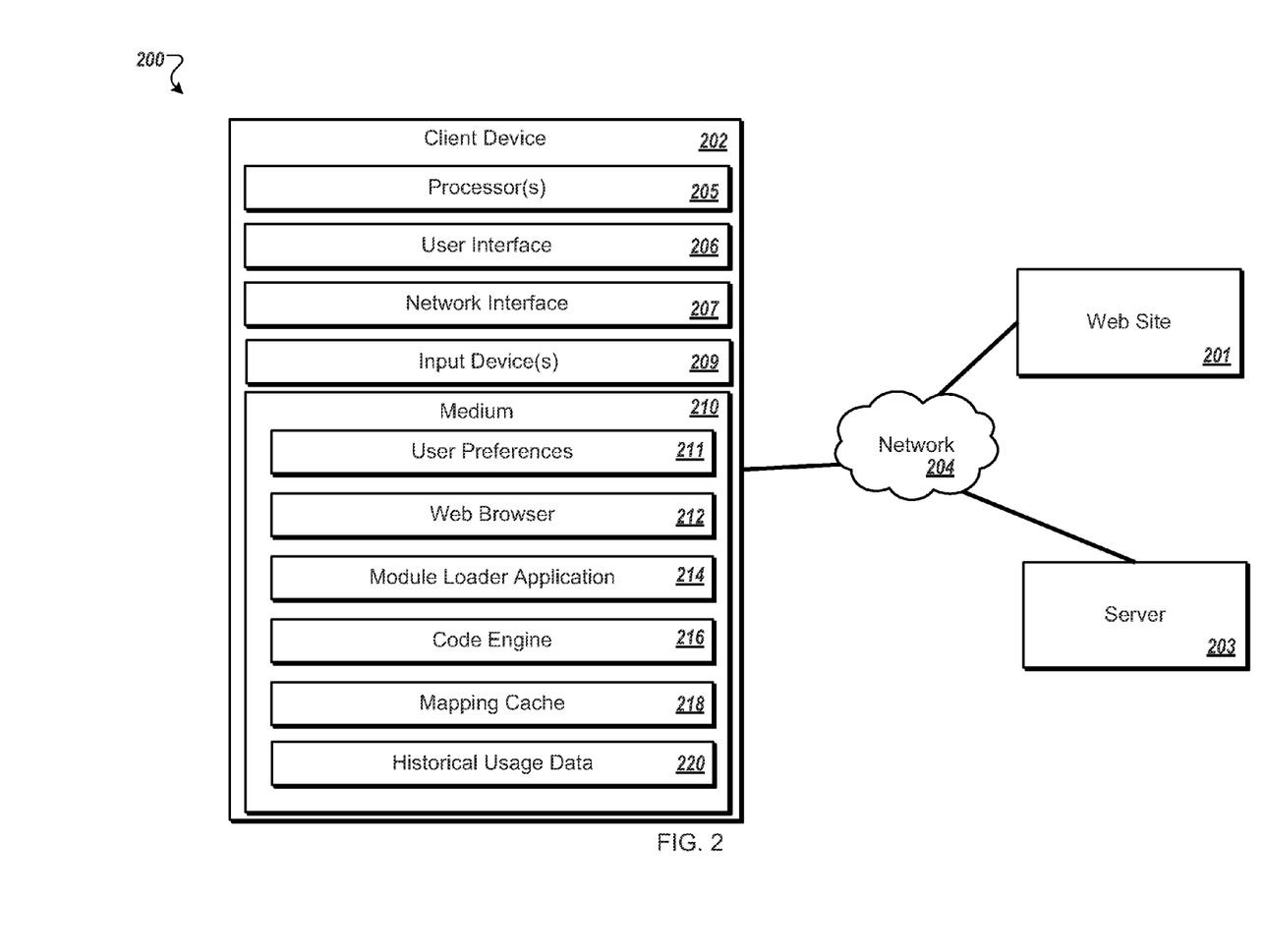
FIG. 2 is a diagram of an example system.

FIG. 2 depicts an example system 200, including a web site 201, a client device 202, and a server 203, connected by way of a network 204. The client device 202 includes one or more processors 205, a user interface 206, a network interface 207, one or more input devices 209, and a computer-readable storage medium 210. The computer-readable storage medium 210 includes user preferences 211, a web browser 212, a module loader application 214, a code engine 216, a mapping cache 218, and historical usage data 220. The client device 202 may be, for example, a mobile phone, a tablet computer, a PDA (Personal Digital Assistant), a smart phone, BlackBerry™ or another handheld or mobile device.

The user interface 206 may output textual, touch, sound and/or graphical data to the user. The one or more processors 205 process operating system or application program computer instructions for the client device 202. The one or more input devices 209 may include, for example, a mouse, a keyboard, a joystick, a trackball, a touch-pad, a camera, a voice input device, a touch screen device implemented in combination with the user interface 206, or any other appropriate input device. The network interface 207 enables the client device 202 to communicate with the web site 201 and the server 203 over the network 204. The network 204 may be, for example, one or more wired or wireless networks, such as the Internet.

The client device 202 may receive a resource (e.g., a HTML document) from the web site 201 in response to an HTTP (HyperText Transfer Protocol) request. The web browser 212 may use a layout engine to build a structured object model (e.g., a DOM tree) for the received resource and may render, for example, a web page on the user interface 206, based on the resource and the structured object model. The web browser 212 may be, for example, Internet Explorer™, offered by Microsoft Inc., Google Chrome™, offered by Google Inc., Opera™ offered by Opera Software ASA, Safari™, offered by Apple Inc., or Firefox™ offered by Mozilla Corporation.

The module loader application 214 loads code modules (e.g., JavaScript code modules). Core code modules are loaded when a resource which references the core code modules is loaded. Other modules may be loaded after the core code modules are loaded, as various events occur. Code modules are executed by a code engine 216. Code modules may be loaded according to parameters specified in the mapping cache 218.

The mapping cache 218 includes user-specific or user-cluster-specific mappings, where a mapping maps a code module to an event and specifies the one or more events that trigger the loading of a code module. Mappings in the mapping cache 218 may be generated based on the historical usage data 220. For example, if historical usage data for a user indicates that a user frequently uses a particular non-core code module, an associated mapping may indicate that the code module should be loaded for the user shortly after a resource which references the code module and core code modules referenced by the resource are loaded, or that the code module should be promoted to being a core code module.

The mapping cache 212 may include multiple mappings for a user (or user cluster). A separate mapping may exist, for example, in the mapping cache 212, for each type of client device 202 used by a user to access the web site 201. For example, a first mapping for a user may be based on historical user data gathered while a user uses a desktop computer to access the web site 201, and a second mapping for a user may be based on historical user data gathered while a user uses a mobile device to access the web site 201. A particular mapping may be selected and referenced (e.g., to determine whether to dynamically load one or more code modules) based on the type of client device 202 that the user uses to access the web site 201, and/or based on other contextual information.

As another example, mappings in the mapping cache 218 may be based on the user preferences 211. For example, a user may configure the user preferences 211 to specify that the user desires certain modules to be loaded shortly after (e.g., a few seconds after) core modules are loaded, or that certain modules should only be loaded in response to a control event. The user preferences 211 may have a higher priority than the historical usage data 220. For example, if the historical usage data 220 indicates that a user frequently uses a code module associated with a particular feature, the code module may nonetheless be loaded only in response to a control event (e.g., not preloaded) if the user preferences 211 specify that the module is to be loaded only in response to a control event.

The mappings cache 218 may include one or more default mappings. For example, the mappings cache 218 may include a default mapping for unauthenticated users and a default mapping for authenticated users. A default mapping may be used, for example, if the mapping cache 218 does not include a user-specific mapping for a user. As another example, mappings in a default mapping may be used if there are no corresponding mappings for a particular code module in a user-specific mapping (e.g., a user-specific mapping for a particular code module may override a default mapping).

Mappings in the mapping cache 218 may be received from the server 203. In some implementations, mappings for a resource are received from the server 203 in response to every request for the resource. In other implementations, mappings for a resource are retrieved from cached mappings in the mapping cache 218. Cached mappings may be updated on a periodic basis (e.g., every day, every three days). Using cached mappings may improve performance, such as in situations where a user frequently (e.g., several times per day) requests the same resource.

Figure 3:
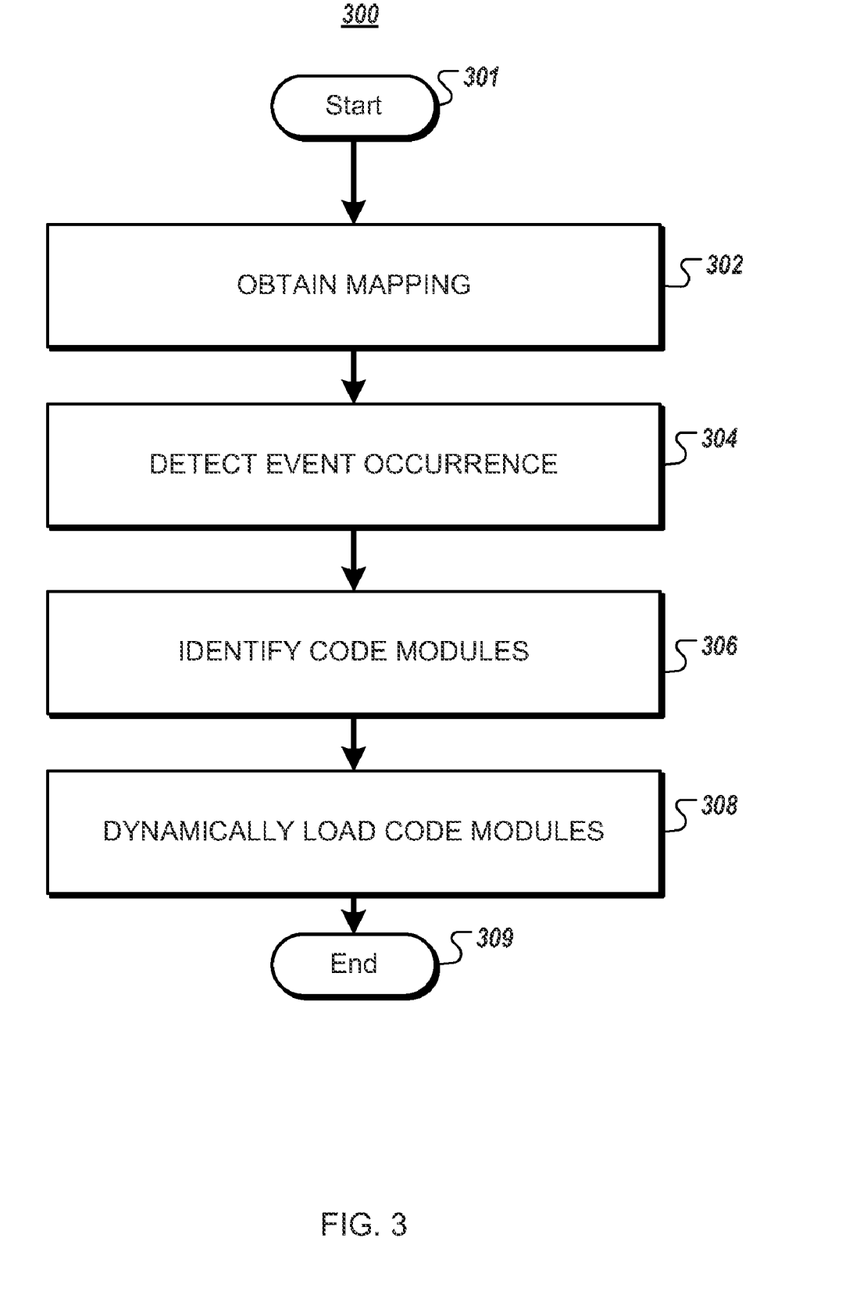
FIG. 3 is a flowchart of an example process.

FIG. 3 is a flowchart of an example process 300. Briefly, the process 300 includes the actions of obtaining a mapping for a resource, where the mapping identifies one or more events that, upon occurrence, will trigger a dynamic loading of one or more code modules that are referenced by the resource, determining that an event has occurred, identifying one or more of the code modules that are associated with the event, based on the mapping, and dynamically loading the identified code modules.

In further detail, when the process 300 begins (301), a mapping (or other data structure or structured information) is obtained for a resource (302). The mapping identifies one or more events that, upon occurrence, will trigger a dynamic loading of one or more code modules that are referenced by the resource. The mapping may be received, for example, by a client device. As another example, the mapping may be selected from among a collection of mappings, by a server. In some implementations, the mapping may be selected from among a collection of mappings, based on the identity of a user of a client device. For example, different users or clusters of users may be associated with different mappings in the collection.

The code modules may, for example, be JavaScript code modules. An event may be, for example, an initial load event that occurs when the resource is initially loaded. Code modules mapped to an initial load event may be referred to as core code modules. A resource may reference zero or more core code modules. For a resource that has no core code modules, the resource may be loaded, before determining that any of the mapped events have occurred, without loading any of the code modules that are referenced by the resource.

Other example events may include a data communication event that occurs when data of a particular type is communicated, an event that occurs when a DOM event is detected (e.g., a control selection event that occurs when a control is selected on a client device), a view change event that occurs when a user interface of a client device switches from a first view to a second view, or a timer firing event that occurs when a predetermined amount of time elapses.

The mapping may be generated based on historical usage data pertaining to past interactions between a user and the resource. For example, it may be determined that, on average, a user accesses a first feature of a resource that is associated with a first code module more frequently than the user accesses a second feature of the resource that is associated with a second code module. Consequently, the mapping may be adjusted to associate an initial load event with the first code module (e.g., to identify the first code module as a core module), and to associate an event other than an initial load event with the second code module.

As another example, it may be determined that, on average, the user accesses a first feature of the resource that is associated with a first code module more frequently than the user accesses a second feature of the resource that is associated with a second code module. Consequently, the mapping may be adjusted to associate timer firing events with both the first code module and the second code module, where the timing firing event associated with the first code module has a shorter firing time than the timing firing event associated with the second code module.

As yet another example, if historical usage data indicates that a user has used a particular feature associated with a code module less than a threshold number of times (e.g., a threshold number of times in a particular time period or a threshold number of times out of a particular number of times the user has used the resource), the mapping may be adjusted to demote a code module from being associated with an initial load event to being associated with a data communication event, a control selection event, or a timing firing event. In other words, the mapping may be adjusted so that the code module is no longer identified as a core code module.

Historical usage data also may indicate, for example, that, a user typically accesses a first feature of a resource that is associated with a first code module after the user accesses a second feature of the resource that is associated with a second code module. Consequently, the mapping may be adjusted to associate one or more events with the first code module. For example, first and second events may be associated with the first code module, where the first event is defined as the loading of the second code module, and the second event is defined as a timer event with a configured timer interval (e.g., a ten second timer interval). Associating the first and second events to the first code module may result in the first code module being loaded a particular number of seconds (e.g., ten) after the second code module is loaded. One or more other events (e.g., timer event, control selection event) may be associated with the second code module. For example, the mapping may be defined such that the second code module is loaded in response to a control selection event and the first code module is loaded ten seconds after the second code module is loaded.

The occurrence of an event is detected (304). For example, a client device may determine that an event has occurred on the client device (e.g., an event handler may be invoked on the client device). The client device may detect, for example, receipt of a particular type of data, a DOM event such as a control selection event, a view change event, or a timer firing event. As another example, a server may receive event information from a client device and the server may determine that an event has occurred, based on the received event information.

One or more of the code modules that are associated with the event are identified based on the mapping (305). For example, one or more of the code modules may be identified by a client device or by a server. A client device may identify one or more of the code modules that are associated with the event by consulting a mapping previously received from a server.

The identified code modules are dynamically loaded (306), thereby ending the process 300 (307). For example, a client device may receive one or more code modules from a server. As another example, a server may communicate an instruction to a host of the identified code modules to transmit the identified code modules to the client device. After the code modules are loaded, one or more of the code modules may be invoked, which may result in the rendering of an updated user interface on a client device.

Figure 4:
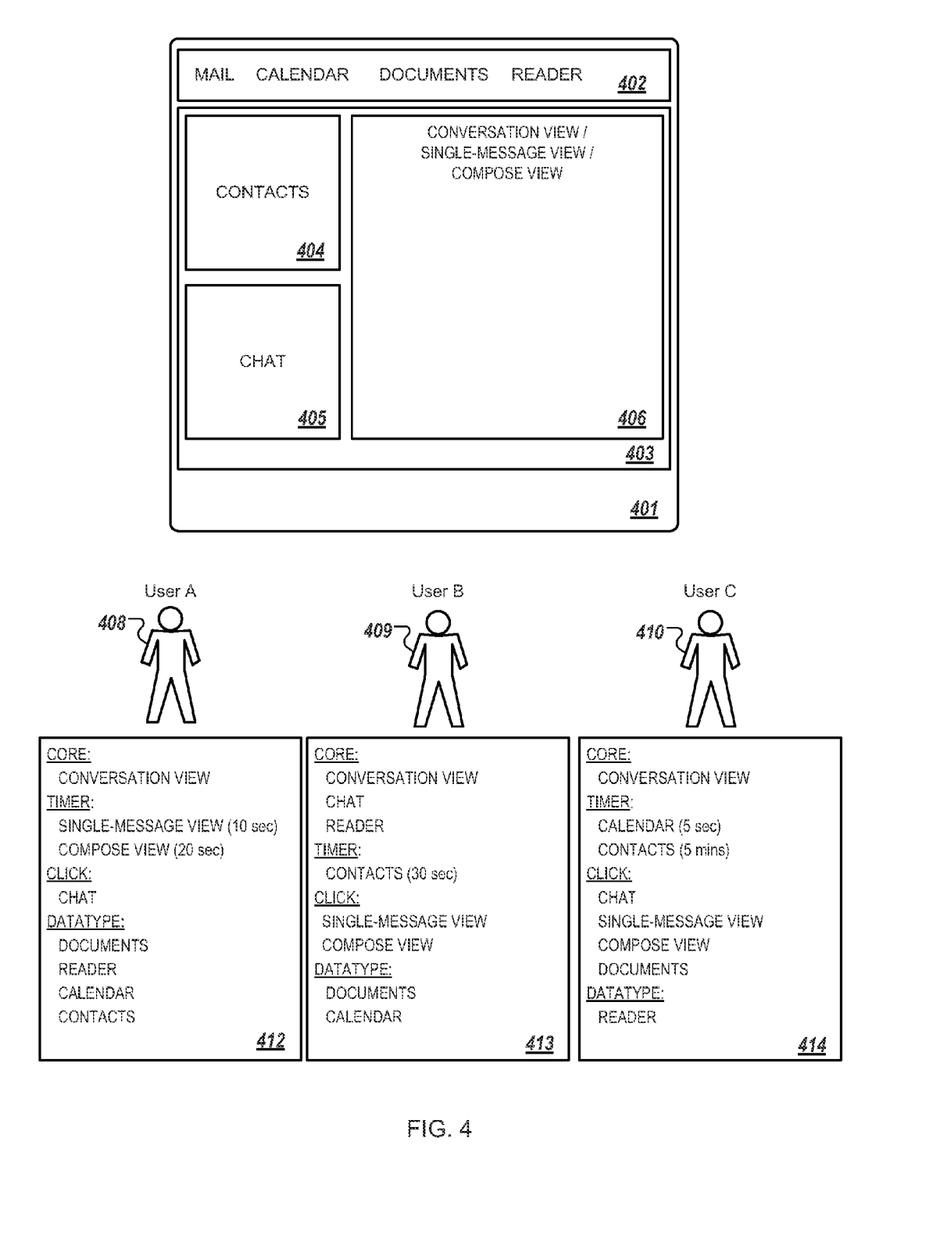
FIG. 4 depicts an example web application and associated mappings.
Like reference numbers and designations in the various drawings indicate like elements.

FIG. 4 depicts a user interface 401 for a web-based mail application. The user interface 401 may be displayed, for example, on a mobile client device. The user interface 401 includes a menu bar 402 which includes mail, calendar, documents, and reader links, which may be selected to invoke mail, calendar, documents, and news reader features, respectively. If the user selects a link in the menu bar 402, an updated view associated with the selected link may be displayed in an area 403.

For example, the area 403 is currently displaying a view corresponding to the mail link. The area 403 includes a contacts area 404 corresponding to a contacts feature, a chat area 405 corresponding to a chat feature, and a message area 406 corresponding to several mail features. For example, the message area 406 may be used to display a conversation view, a single message view, or a compose view. A conversation view may be used to display a list of messages grouped by subject, such as messages in a user's electronic mail inbox. A single message view may be used to view or show a single message to a user. For example, the single message view may be displayed in response to a user selecting a message in the conversation view. A compose message view may be used to allow a user to compose a message.

A summary list of the features available to the user in the user interface 401 includes documents, reader, calendar, contacts, chat, conversation view, single-message view, and compose view. Each of these features may be associated with one or more code modules, and each code module may be associated with one feature (e.g., each of the code modules may be designed to include code related to a particular feature). As described above, a mappings database may include one or more mappings, where each mapping associates, for a particular user, an event for each of one or more code modules. The mail application may be configured so that the occurrence of an event referenced in the mappings for the user triggers the loading of the respective code module(s) mapped to the event.

Also as mentioned above, mappings may be generated based on historical usage data on a per-user basis. Different users may use different features in different amounts. For example, a user A 408 may generally use different features than a user B 409, and the user B 409 may use different features or may use features with a different frequency than a user C 410. Mappings 412-414 may be associated with the users 408-410, respectively. For example, the mapping 412 maps features of the mail application to different types of events, for the user 408. The conversation view feature is mapped to an initial load event, meaning that the conversation view feature is considered a core feature for the user 408 and that code modules associated with the conversation view feature are considered core code modules. For example, the conversation view may be a default view that is initially displayed, meaning that code modules associated with the conversation view may need to be loaded when the resource associated with the user interface 401 is initially loaded.

The mapping 412 indicates that code modules associated with the single-message view feature and the compose view feature are mapped to timer events, with a first timer event handler configured to load the code modules associated with the single-message view feature ten seconds after the mail application is loaded, and a second timer event handler configured to load the code modules associated with the compose view feature twenty seconds after the mail application is loaded. The mapping 412 reflects a preference or tendency of the user 408 to frequently use the single-message view and compose view features of the mail application shortly after the mail application is loaded, with the single-message view feature being typically used before the compose view feature. In other words, the mapping 412 reflects that the user 408 is a user who frequently uses the mail application to read and write electronic mail messages.

The mapping 412 also indicates that the code modules associated with a chat feature are mapped to a click event for the user 408, indicating that the user 408 does not frequently use the chat feature. Mapping the code modules associated with the chat feature to a click event for the user 408 results in the code modules associated with the chat feature being loaded only on demand, in response to a click event.

The mapping 412 also indicates that the documents, reader, calendar, and contacts features are mapped to datatype events for the user 408. A datatype event occurs when data of a particular type is communicated to the mail application. For example, the mail application may receive news feed data which may trigger a news feed datatype event, which may, according to the mapping 412, cause code modules associated with the reader feature to be loaded. A news feed datatype event may be used, for example, to only load code modules associated with reading news if there is actually news data to process. As another example, code modules for certain calendar features (such as editing appointments) may only be loaded if it is determined that there are actually appointments on the user's calendar.

The mapping 413 is associated with the user 409. The user 409 has different mappings than the user 408, indicating different usage behavior between the two users. For example, similar to the mapping 412 for the user 408, the mapping 413 indicates that the conversation view feature is a core, or frequently-used feature for the user 409. However, the mapping 413 indicates that the chat and reader features are also core features for the user 409, which results in the code modules associated with the chat and reader features being loaded when the mail application is loaded. The chat and reader features may be identified as core features for the user 409 based on respective use-frequencies of those features each being higher than a threshold frequency. Or, as another example, the chat and reader features may be identified as core features for the user 409 based on a determination that the user 409 frequently uses those features of the mail application very shortly (e.g., less than a threshold number of seconds) after the mail application is loaded.

The mapping 413 also indicates that code modules associated with the contacts feature are mapped to a timer event with a thirty second timer interval, indicating that the user 409 typically uses the contacts feature thirty seconds after the mail application is loaded. The mapping 413 also indicates that code modules associated with the single-message view and compose view features are mapped to click events, indicating that the user 409 does not frequently use these features. The mapping 413 also indicates that the documents and calendar features are mapped to datatype events.

The mapping 414 is associated with the user 410. Similar to the mapping 412 for the user 408, the mapping 414 indicates that the conversation view feature is a core, or frequently-used feature for the user 410. The mapping 414 indicates that code modules associated with the calendar feature are mapped to a timer event with a five second timer interval, indicating that the user 410 typically uses the calendar feature five seconds after the mail application is loaded. Similarly, the mapping 414 indicates that code modules associated with the contacts feature are mapped to a timer event with a five minute timer interval, indicating that the user 410 typically uses the contacts feature five minutes after the mail application is loaded.

The mapping 414 also indicates that code modules associated with the chat, single-message view, compose view, and documents features are mapped to click events, indicating the user 410 does not frequently use these features. The mapping 414 also indicates that the reader feature is mapped to a datatype event.

Figure 5:
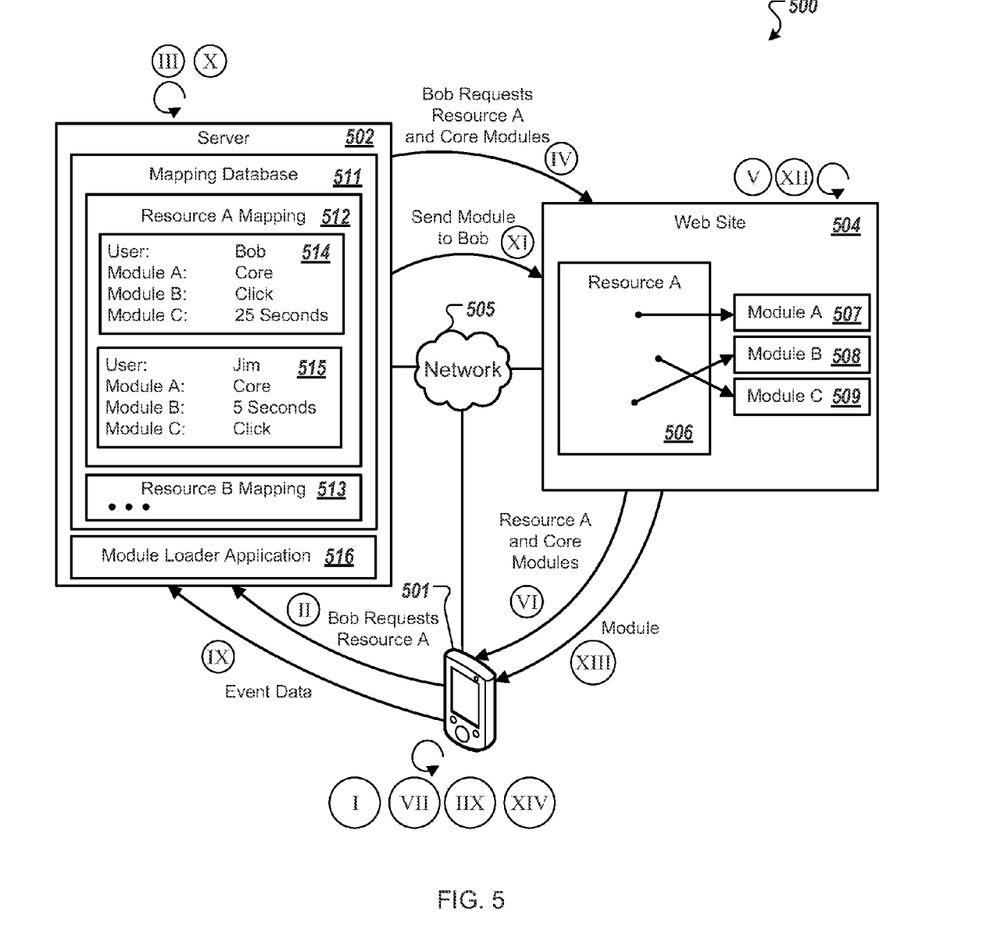

FIG. 5 is a diagram that illustrates another example of event-driven, dynamic loading of code modules. Similar to the example system 100, example system 500 includes a client device 501, a server 502, and a web site 504, connected by way of a network 505. The web site 504 hosts a resource 506 ("Resource A") that references code modules 507 to 509. The server 502 includes a mapping database 511 that stores mappings for different resources, including a mappings 512 for resource 506 and a mappings 513 for a resource "B". The mappings 512 include mappings for different users or clusters of users, including a mapping 514 for a user "Bob," and a mapping 515 for a user "Jim." The server 502 also includes a module loader application 516.

In state "I," the user "Bob" enters a command into the client device 501 to invoke a web application that requires the resource 506 to be loaded. In state "II," the client device 501 sends a request to access the resource 506, to the server 502. In addition to identifying the resource 506, the information communicated between the client device 501 and the server 502 includes information that uniquely identifies the user "Bob" and the client device 501.

In state "III," upon receiving the request to access the resource 506, the module loader application 516 consults the mapping database 511 to identify a mapping that is appropriate to both the resource 506 and the user "Bob," specifically the mapping 514. Similar to the mapping 111 of FIG. 1, the mapping 514 includes several parameters associated with the resource 506 and the modules 507 to 509 that are referenced by the resource 506, where the parameters are tailored to the user "Bob." Specifically, the mapping 514 specifies that module A 507 is a core module that should be loaded when the resource 506 is initially loaded, that the module B 508 should be loaded upon the selection of a control by user "Bob" after the resource 506 is initially loaded, and that the module C 509 should be loaded twenty-five seconds after the resource 506 is initially loaded.

In state "IV," in contrast to the example of FIG. 1, the server 502 submits a request to the web site 504, requesting that the web site 504 send the resource 506 and associated core modules to the client device 501. The request sent to the web site 504 includes information which uniquely identifies the requested resource and the core module(s) to send (e.g., for this example, information which uniquely identifies the resource 506 and the module A 507). Additionally, the request sent to the web site 504 includes information which uniquely identifies the client device 501.

In state "V", the web site 504 parses the request to extract the identities of the requested resource, the requested core module(s), and the client device 501. The web site 504 may locate and create a copy of the requested core module(s) and the requested resource. In state "VI", the web site 504 sends the copies of the requested resource and the associated core modules to the client device 501.

In state "VII," the client device 501 loads the received resource and the received core modules. In state "IIX", the client device 501 detects an event, such as a click event. In state "IX", the client device sends event data describing the event to the server 502. The event data may be sent with information that uniquely identifies the user "Bob", the client device 501, and the resource being viewed in the client device 501 (e.g., the resource 506).

In state "X", the module loader application 516 consults the mapping database 511 to identify a mapping that is appropriate to both the resource associated with the received event data and the user "Bob," specifically the mapping 514. The module loader application 516 identifies a module in the identified mapping which correlates to the received event data. For example, the received event data may indicate that the user "Bob" selected a control associated with the module B 508.

In state "XI", the server 502 submits a request to the web site 504, requesting that the web site 504 send the identified module to the client device 501. The request sent to the web site 504 includes information which uniquely identifies the requested module and the client device 501. In state "XII", the web site 504 parses the request to extract the identities of the requested module and the client device 501. The web site 504 may locate and create a copy of the requested module. In state "XIII", the web site 504 sends the copy of the requested module to the client device 501.

In state "XIV," the client device 501 dynamically loads the copy of the code module received from the web site 504. The client device 501 may, after loading the code module, invoke the code module. In response to invoking some code modules, an updated user interface may be rendered on the client device 501.

In another example implementation, the server 502 and the web site 504 are different logical functions of the same physical entity. For example, a physical entity including one or more server machines may implement both the functionality of the server 502 and the web site 504.

In yet another alternative implementation, all non-core modules are loaded using one or more timers. For example, one or more timers may be started after the resource and the associated core modules are loaded, and one or more modules may be loaded when each timer expires. Module loading may be staggered, such as by loading one module every few seconds until all modules are loaded. Historical usage data may be analyzed to determine an order in which to load the modules (e.g., commonly-used modules may be loaded before other modules).

In still yet another alternative implementation, a separate module loader is not used. Rather, application code issues commands to load modules whenever they are needed. In this non-preferred approach, however, abstraction may be lost and application code may become inter-mingled with module loading code.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A system comprising:
one or more computers; and
a computer-readable medium coupled to the one or more computers having instructions stored thereon which, when executed by the one or more computers, cause the one or more computers to perform operations comprising:
receiving a request to load a web resource;
accessing historical usage data pertaining to past interactions between a user and the web resource;
generating a mapping for the web resource based on the historical usage data, wherein the mapping identifies (i) one or more core code modules that are to be loaded when the web resource is initially loaded, and (ii) and one or more non-core code modules that are not to be loaded when the web resource is initially loaded, but that are to be dynamically loaded upon occurrence of an event;
loading the web resource and the one or more core code modules;
after loading the web resource and the one or more core code modules, determining that the event has occurred; and
after determining that the event has occurred, dynamically loading the non-core code modules.

2. The system of claim 1, wherein the operations further comprise:
loading, before determining that the event has occurred, the resource without loading the non-core code modules.

3. The system of claim 1, wherein the code module further comprises a JavaScript code module.

4. The system of claim 1, wherein:
the event comprises an event that occurs a predetermined period of time after the resource is initially loaded.

5. The system of claim 1, wherein:
the event comprises a data communication event that occurs when data of a particular type is communicated between a client device that loads the resource, and a server.

6. The system of claim 1, wherein:
the event comprises a Document Object Model (DOM) event that occurs when a DOM event is detected.

7. The system of claim 1, wherein:
the event comprises a control selection event that occurs when a control is selected on a client device.

8. The system of claim 1, wherein
the event comprises a view change event that occurs when a user interface of a client device switches from a first view to a second view.

9. The system of claim 1, wherein:
the event comprises a timer firing event that occurs when a predetermined amount of time elapses.

10. The system of claim 1, wherein:
obtaining a mapping for a resource further comprises receiving the mapping for the resource by a client device;
determining that the event has occurred further comprises determining, by the client device, that the event has occurred on the client device; and
dynamically loading the non-core code modules further comprises receiving the non-core code modules by the client device from over a network, after the event has occurred.

11. The system of claim 1, wherein:
obtaining the mapping for a resource further comprises selecting the mapping from among a collection of mappings, by a server;
determining that the event has occurred further comprises:
receiving, by the server, information from a client device, and determining, by the server, and based on the information received from the client device, that the event has occurred; and dynamically loading the non-core code modules further comprises communicating, by the server, an instruction to a host of the non-core code modules to transmit the non-core code modules to the client device.

12. The system of claim 1, wherein the operations further comprise:

determining an identity of a user, wherein obtaining a mapping for the resource further comprises selecting the mapping, from among a collection of mappings, based on the identity of the user.

13. The system of claim 12, wherein different users are associated with different mappings in the collection.

14. The system of claim 1, wherein generating the mapping further comprises:

determining that, on average, the user accesses a first feature of the resource that is associated with a first code module more frequently than the user accesses a second feature of the resource that is associated with a second code module; and responsive to determining that, on average, the user accesses the first feature more frequently than the second feature, adjusting the mapping to designate the first code module as a core code module, and to designate the second code module as a non-core code module.

15. The system of claim 1, wherein generating the mapping further comprises:

determining that, on average, the user accesses a first feature of the resource that is associated with a first code module more frequently than the user accesses a second feature of the resource that is associated with a second code module; and responsive to determining that, on average, the user accesses the first feature more frequently than the second feature, adjusting the mapping to associate timer firing events with both the first code module and the second code module, wherein the timing firing event associated with the first code module has a shorter firing time than the timing firing event associated with the second code module.

16. The system of claim 1, wherein generating the mapping further comprises:

adjusting the mapping to designate a code module that was previously designated as a core code module, as being a non-core code module.

17. The system of claim 1, wherein the operations further comprise rendering an updated user interface in response to loading the web resource and the one or more core code modules.

18. A computer-implemented method comprising:

receiving a request to load a web resource;

accessing historical usage data pertaining to past interactions between a user and the web resource;

generating, by one or more computers, a mapping for the web resource based on the historical usage data, wherein the mapping identifies (i) one or more core code modules that are to be loaded when the web resource is initially loaded, and (ii) and one or more non-core code modules that are not to be loaded when the web resource is initially loaded, but that are to be dynamically loaded upon occurrence of an event;

loading the web resource and the one or more core code modules;

after loading the web resource and the one or more core code modules, determining that the event has occurred; and after determining that the event has occurred, dynamically loading the non-core code modules.

19. A computer storage medium encoded with a computer program, the program comprising instructions that when executed by data processing apparatus cause the data processing apparatus to perform operations comprising:

receiving a request to load a web resource;

accessing historical usage data pertaining to past interactions between a user and the web resource;

generating, by one or more computers, a mapping for the web resource based on the historical usage data, wherein the mapping identifies (i) one or more core code modules that are to be loaded when the web resource is initially loaded, and (ii) and one or more non-core code modules that are not to be loaded when the web resource is initially loaded, but that are to be dynamically loaded upon occurrence of an event;

loading the web resource and the one or more core code modules;

after loading the web resource and the one or more core code modules, determining that the event has occurred; and after determining that the event has occurred, dynamically loading the non-core code modules.

* * * * *